United States Patent [19]

Gueli

[11] Patent Number: 4,796,420

[45] Date of Patent: Jan. 10, 1989

[54] FUSIBLE LINK CONSTRUCTION

[75] Inventor: Carmen Gueli, Saginaw, Mich.

[73] Assignee: Van Wormer Management Corporation, Standish, Mich.

[21] Appl. No.: 119,956

[22] Filed: Nov. 13, 1987

[51] Int. Cl.⁴ .............................................. F16G 15/10
[52] U.S. Cl. .......................................... 59/93; 59/86; 59/85; 59/78; 16/48.5
[58] Field of Search .......................... 59/93, 85, 78, 86; 49/1, 4, 7, 8; 16/48.5, 222; 24/602, 116 R, 115 F, 31 L; 169/38

[56] References Cited

U.S. PATENT DOCUMENTS

| | | | |
|---|---|---|---|
| 3,089,568 | 5/1963 | Thompson | 16/48.5 |
| 3,597,809 | 8/1971 | Crane | 49/8 |
| 3,725,972 | 4/1973 | McCabe | 16/48.5 |
| 3,779,004 | 12/1973 | Gloeckler | 59/93 |
| 4,346,554 | 8/1982 | Glinecke | 59/93 |
| 4,657,085 | 4/1987 | Jacobsen | 169/38 |

Primary Examiner—David Jones
Attorney, Agent, or Firm—Learman & McCulloch

[57] ABSTRACT

A fusible link has a tubular housing having a recess in one side thereof in communication with a bore at one end of which one end of a thermally sensitive strut is seated. A yoke has at one end thereof an arm against which the opposite end of the strut seats. The strut resists relative movement of the housing and the yoke until such time as the strut collapses whereupon the arm is cammed out of the recess enabling separation of the housing and the yoke.

15 Claims, 1 Drawing Sheet

FUSIBLE LINK CONSTRUCTION

This invention relates to a fusible link construction which normally is subjected to a constantly applied force that is resisted by a thermally sensitive link until such link collapses, thereupon resulting in the automatic actuation of a device such as a door closure, a fire extinguisher, or an alarm.

BACKGROUND OF THE INVENTION

A fusible link conventionally is used in those instances in which it is desired that some mechanism operate automatically, but not until there is an increase in temperature such as that resulting from a fire. Mechanisms of the kind adapted for such automatic operation include fire door closing apparatus, sprinkler operating units, alarm systems, and the like. Conventionally, a fusible link is interposed between relatively movable members which are restrained from movement by a temperature sensitive strut until such time as its temperature increases to a predetermined level, whereupon the link collapses and becomes ineffective to prevent relative movement between such members.

Numerous kinds of fusible links have been proposed heretofore, two of which are disclosed in U.S. Pat. Nos. 3,779,004 and 4,346,554. Although such fusible links are reliable, they require multiple parts, rely upon moment arms, and are relatively expensive to manufacture and assemble compared to a link according to the present invention.

SUMMARY OF THE INVENTION

A fusible link constructed in accordance with the invention comprises only four components that are simple to manufacture and easy to assemble. The parts are assembled in such manner as to avoid the necessity of having to rely upon any moment arm, thereby providing a direct relationship between the load rating of and the load applied to the link.

A preferred embodiment of a fusible link constructed in accordance with the invention has a tubular housing provided with a recess in one side thereof through which an arm of a yoke may be accommodated. The arm of the yoke is joined at its opposite ends to parallel legs that are spaced apart a distance sufficient to accommodate therebetween a portion of the tubular housing. At one end of the tubular housing is a seat for one end of a thermally sensitive strut, the opposite end of which seats upon the arm of the yoke. The yoke is maintained in assembled relation with the tubular housing and the strut by key-like guides and a retaining screw that is fitted to the tubular housing forms an anchor at one end of the link, and is adapted for attachment to a force applying member. That end of the yoke opposite the arm is adapted for attachment to another force applying member which, in conjunction with the first-mentioned force applying member, constantly applies a force on the link tending to separate the members thereof, which force normally is overcome by the strut.

The strut contains a eutectic material which, in response to a predetermined rise in its temperature, effects disintegration and collapse of the strut, thereby removing the resistance offered to the forces applied by the force applying members. The housing and yoke members of the strut thus are capable of movement relative to one another. One edge of the recess in the tubular body is formed as an inclined ledge which cams the arm of the yoke outwardly of the recess, thereby permitting separation of the housing and yoke members in response to collapse of the strut.

THE DRAWING

A preferred embodiment of the invention is disclosed in the following description and in the accompanying drawing wherein.

DETAILED DESCRIPTION

Figure 1:
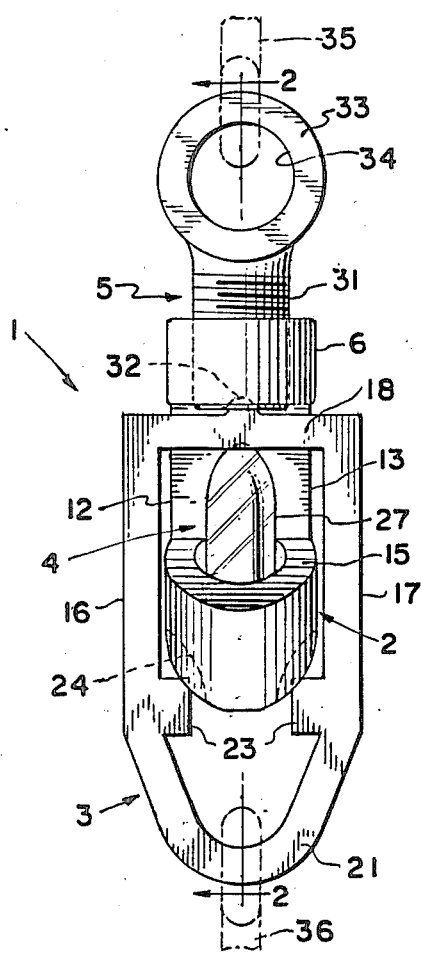
FIG. 1 is an elevational view illustrating the parts of the fusible link in assembled relation.

A fusible link formed in accordance with the preferred embodiment of the invention is designated generally by the reference character 1 and comprises a tubular body member 2, a flat body member or yoke 3, a thermally sensitive strut 4, and a retaining screw 5.

The tubular body 2 has a generally cylindrical housing having a wall 6 through which extends a bore 7 terminating at one end in a shoulder or seat 8. In communication with the bore 7 is an axial port 9, a radial port 10, and a recess 11 defined by parallel, longitudinal sides 12 and 13, a radial top edge 14, and an inclined lower ledge 15. That end of the bore remote from the seat 8 is threaded. The ports 9 and 10, as well as the recess 11, ensure communication of the bore 7 with ambient temperature.

The body or yoke 3 comprises a flat member having parallel, spaced apart legs 16 and 17 connected at corresponding ends by an arm 18 and at their opposite ends by converging limbs 19 and 20 joined to one another by an arcuate connector 21. The legs, the arm, and the limbs of the yoke 3 define an open space 22 the transverse dimension of which is greater than the diameter of the tubular housing 6. The legs 16 and 17 are provided with inwardly directed guide keys 23 which extend inwardly of the space 22, but terminate short of one another. The keys 23 may be slideably accommodated in keyways 24 formed in opposite sides of the housing 6. The arm 18 has an outwardly projecting spike 25 on its outer surface and a dimple or detent 26 in its inner surface.

The strut 4 is conventional and comprises a sealed body 27 formed of a glass material known as quartzoid, or other suitable material, and containing a eutectic liquid such as a mixture of water and glycerin which expands rapidly in response to an increase in its temperature to a predetermined level. The body 27 has at one end thereof a tapered neck 28 that terminates in a tip 29. The opposite end of the body 27 terminates in a convex nose 30.

The retaining screw 5 has a threaded stem 31 adapted for accommodation in the threaded end of the bore 7, such stem 31 terminating at one end in a dimple 32 that is nestable with the spike 25. At its opposite end the stem 31 terminates in an anchor member 33 having an opening 34 therein.

The parts of the link 1 may be assembled by fitting the body 27 of the strut 4 into the bore 7 of the housing 6 in such manner that the strut is interposed between the arm 18 and the seat 8. Thereafter, the yoke 3 may be assembled with the housing by introducing the keys 23 into the keyways 24 and rocking the member 3 in such direction as to enable the arm 18 to enter the bore 7 via the recess 11. The width of the keyways 24 and the distance between the edge 14 of the recess 11 and the nose 30 of the strut body 27 are sufficient to permit such rocking movement of the yoke 3.

When the arm 18 of the yoke 3 occupies the bore 7, the nose 30 of the strut body 27 may be fitted into the dimple 26 of the arm 18, following which the retaining screw 5 may be turned in such direction as to cause its dimple 32 to receive the spike 25 of the arm. Further rotation of the retaining screw 5 will cause the neck 28 of the strut 4 to seat firmly against the seat 8 and the nose 30 to seat firmly in the dimple 26. The strut 4 then will resist further rotation of the retaining screw 5. The force applied to the strut 4 by the retaining screw 5 may be that resulting from turning the screw until it is finger tight or, if a precise force is desired, by applying a torque wrench to the screw 5.

Figure 2:
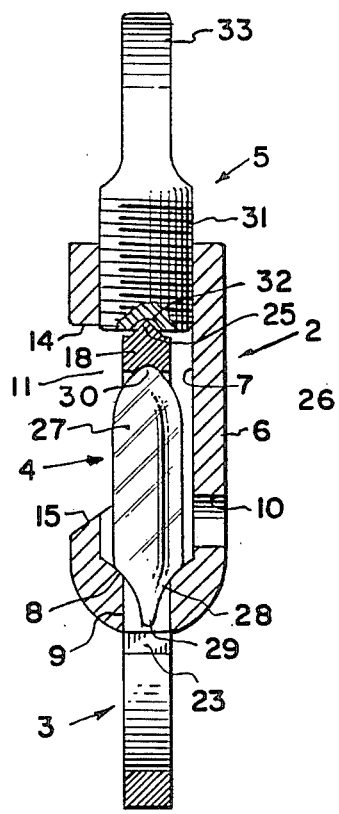
FIG. 2 is a sectional view taken on the line 2—2 of FIG. 1.
Figure 3:
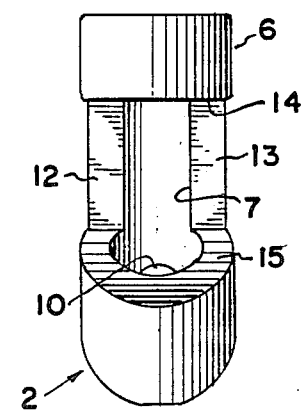
FIG. 3 is a front elevational view of the tubular body member only.
Figure 4:
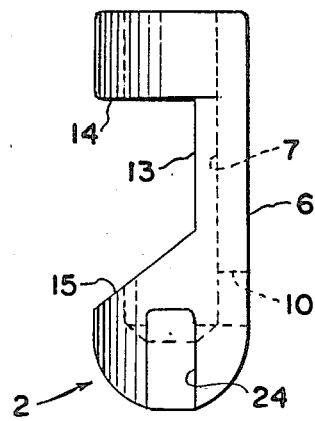
FIG. 4 is a side elevational view of the tubular body member.
Figure 5:
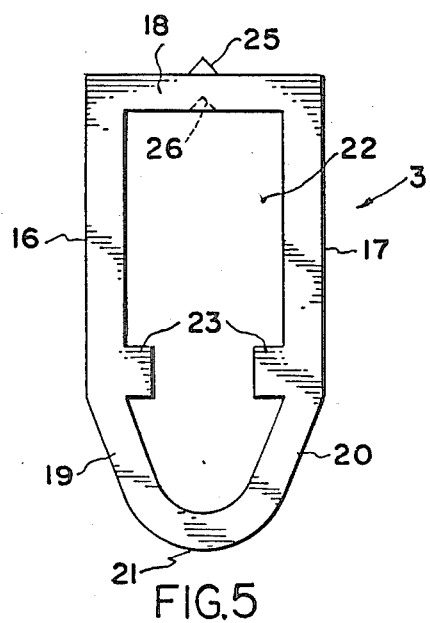
FIG. 5 is a front elevational view of the yoke member.
Figure 6:
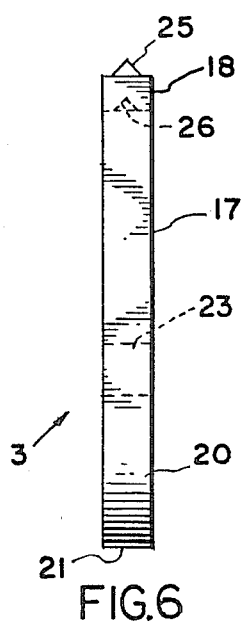
FIG. 6 is a side elevational view of the yoke member.

The assembled link then may be coupled at its opposite ends to chain or the like connectors 35 and 36 by means of which a continuous force in tension can be applied on the members 2 and 3 which normally is resisted by the strut 4. Should the ambient temperature to which the strut 4 is subjected reach a selected predetermined level between 160° F. and 500° F., for example, the liquid contained within the strut body 27 will expand suddenly resulting in disintegration and collapse of the strut, thereby removing the resistance to relative movement of the members 2 and 3 due to the force applied thereon via the connectors 35 and 36. Thus, the member 2 may move upwardly, as viewed in FIG. 2, and the member 3 may move downwardly, as viewed in FIG. 2. When the members 2 and 3 have moved a distance sufficient that the arm 18 engages the ledge 15, the arm will be cammed outwardly of the bore 7 through the recess 11, thereby resulting in complete separation of the members 2 and 3.

Of particular significance is the fact that the strut 4 occupies a position directly i line with the force exerted on the members 2 and 3 tending to separate them. As a consequence, no moment arms are involved in calculating the force to which the strut 4 may be subjected, nor does separation of the assembled parts of the link depend upon anything other than collapse of the strut 4. Consequently, the rating of the fusible link can be determined with great precision.

Since the link construction does not rely upon moment arms, springs, or the like, it ca be of compact size, thereby enabling it to be utilized in smaller areas than otherwise would be the case.

The disclosed embodiment is representative of the presently preferred form of the invention, but is intended to be illustrative rather than definitive thereof. The invention is defined in the claims.

I claim:

1. A fusible link construction comprising a first body having in one side thereof a recess terminating at one end in a ledge member; a second body having an arm member accommodated in said recess for movements toward and away from said ledge member; a thermally sensitive, collapsible strut reacting between said bodies, said strut having its opposite ends seated on the respective bodies and normally maintaining said arm member spaced from said ledge member; and means carried by said bodies for coupling them to force applying means operable to effect relative movement of said bodies in response to collapse of said strut and in such direction as to cause said arm member to move toward engagement with said ledge member, said members being so configured that engagement therebetween effects ejection of said arm member from said recess and separation of said bodies.

2. A fusible link construction according to claim 1 wherein said ledge member has an inclined surface confronting said arm member.

3. A fusible link construction according to claim 1 wherein said strut includes a eutectic material operable in response to a predetermined increase in its temperature to effect collapse of said strut.

4. A fusible link construction according to claim 1 including retainer means carried by said first body and bearing against said arm member for clamping said arm member against said strut.

5. A fusible link construction according to claim 5 wherein said retainer means is adjustable in directions toward and away from said ledge member.

6. A fusible link construction according to claim 1 wherein said first body comprises a tubular housing having a circumferential wall interrupted by said recess.

7. A fusible link construction according to claim 6 wherein said housing has a bore terminating at one end in a seat for said strut.

8. A fusible link construction according to claim 7 wherein said bore is threaded at its opposite end for the accommodation of an adjustable retainer engageable with said arm member.

9. A fusible link construction according to claim 8 wherein said arm member and said retainer have confronting surfaces with nestable parts.

10. A fusible link construction according to claim 7 wherein said wall of said housing has at least one opening therein other than said recess in communication with said bore.

11. A fusible link construction according to claim 1 including guide means reacting between said bodies for guiding the movements of said arm member in said recess.

12. A fusible link construction according to claim 11 wherein said guide means comprises keys and keyways.

13. A fusible link construction according to claim 11 wherein said second body comprises a yoke of which said arm member is a part, said yoke defining an open space of such size as to accommodate therein a portion of said first body.

14. A fusible link construction according to claim 13 wherein said guide means comprises at least one key carried by said second body and projecting into said space and at least one keyway formed in said first body and accommodating said key.

15. A fusible link construction comprising a tubular housing provided with a bore extending inwardly from one end of said housing and terminating at one end in a seat, said housing having a recess in one side thereof in communication with said bore, said recess having at one end thereof an inclined ledge; a yoke having arms defining an open space, one of said arms being accommodated in said recess at that end thereof remote from said ledge, said space being of such size as to enable the remaining arms of said yoke to be external of said housing; a thermally sensitive, collapsible strut accommodated in said bore and having one end thereof seated on said seat and its opposite end seated on said one arm, said strut normally maintaining said one arm spaced from said ledge; guide means reacting between said housing and said yoke for guiding relative movements of said housing and said yoke longitudinally of said recess and normally preventing relative movements of said yoke and said housing transversely of said recess; and means carried by said housing and said yoke for coupling them to force applying means operable to effect relative movement of said housing and said yoke a distance in such direction as to disengage said guide means and cause said one arm to engage said ledge and effect ejection of said one arm from said recess.

* * * * *

UNITED STATES PATENT AND TRADEMARK OFFICE
CERTIFICATE OF CORRECTION

PATENT NO. : 4,796,420
DATED : January 10, 1989
INVENTOR(S) : Carmen Gueli

It is certified that error appears in the above-identified patent and that said Letters Patent is hereby corrected as shown below:

Column 3, line 43, change "i" to -- in --.

Column 3, line 52, change "ca" to -- can --.

Column 4, line 20, change "5" (second occurence) to -- 4 --.

Signed and Sealed this

Ninth Day of May, 1989

Attest:

DONALD J. QUIGG

Attesting Officer

Commissioner of Patents and Trademarks